(No Model.)
R. MILLER.
CULTIVATOR.
No. 492,692.  Patented Feb. 28, 1893.
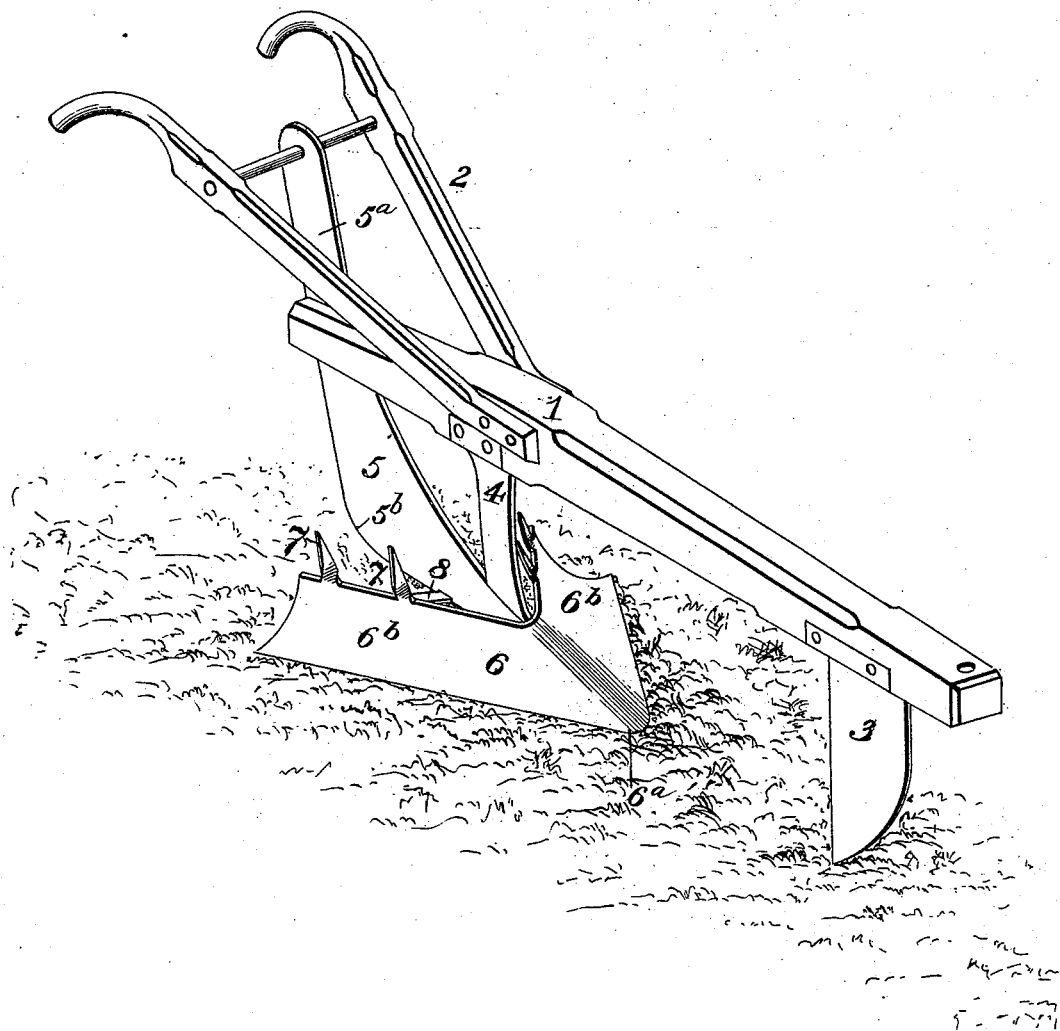
Witnesses:
R. D. Cooley
Milton Smalley
Inventor:
Ruben Miller

UNITED STATES PATENT OFFICE.

RUBEN MILLER, OF SERGEANT BLUFFS, IOWA.

CULTIVATOR.

SPECIFICATION forming part of Letters Patent No. 492,692, dated February 28, 1893.

Application filed September 8, 1890. Renewed October 31, 1892. Serial No. 450,441. (No model.)

*To all whom it may concern:*

Be it known that I, RUBEN MILLER, a citizen of the United States, residing at Sergeant Bluffs, in the county of Woodbury and State of Iowa, have invented a new and useful Cultivator-Plow, of which the following is a specification.

My invention relates to cultivators and more especially to that class known as cultivator plows used in cultivating listed corn or other crops planted in rows; and it has for its object to provide a cultivator of this character that will effectively cut all the weed roots between the rows and to loosen up and throw the soil to the center of the rows so as not to cover up the corn or other produce as is usually the case where other cultivators are employed.

With these and other objects in view, which will readily appear as the nature of the invention is fully understood, the same consists in the novel construction, arrangement and combination of parts hereinafter more fully described, illustrated and claimed.

In the accompanying drawing;—the figure is a perspective view of a cultivator plow constructed in accordance with my invention.

Referring to the accompanying drawing; 1 represents the beam constructed of any suitable material and provided as usual at its inner end with the rearwardly extending handles 2, by which the plow is controlled depending from near the front end of the beam 1, and securely fastened thereto is the advance colter or cutter 3, having a front receding rounded cutting edge which traveling in front of the sweep and cultivating attachments to the beam, to be described, removes the obstructions such as stalks weeds, &c., from the path of the plow, secured to said beam near its inner end is the standard 4 supporting at its lower end the traveling rudder plate 5, arranged to run with its lower edge upon the ground and having an almost right angular and upwardly extending shank or reduced portion $5^a$ through which passes the round or brace of the handles as illustrated, serving to keep the same steadily in place. Said rudder plate or blade 5 is widened at its center and has a sharp rounded angle $5^b$ between its vertical and horizontal ends forming a pivotal point or fulcrum for guiding the plow, which is a point of great advantage in plows or cultivators of this class. Secured to the front lower end of said standard 4, is the inclined double scraper or sweep 6 diverging from its rounded point $6^a$ to both sides of the standard forming cutting wings $6^b$, that serve to cut all surface weeds to any depth desired and thoroughly loosen up the soil. A series of upwardly extending curved breaking and throwing prongs or supplemental mold board 7 projecting integrally therefrom and designed to break the clods of earth and throw the same to the intermediate rudder plate which is connected with said wings by the under cross braces 8.

It is thought that from the foregoing the construction and operation of my improved cultivator plow will be quite apparent.

Having thus described my invention, what I claim, and desire to secure by Letters Patent, is—

In a cultivator plow, the combination with a beam and standard and a colter having a draw-cut, of a brace or rudder plate arranged to run with its lower edge upon the ground, having a widened center and a sharp angle between its vertical and horizontal ends forming a pivotal point or fulcrum for guiding the plow, the cross-brace beneath the rudder plate, and the scraper having the points or small moldboards, substantially as shown and described.

In testimony that I claim the foregoing as my own I have hereto affixed my signature in the presence of two witnesses.

RUBEN MILLER.

Witnesses:
   J. T. DUNLAP,
   ALEX. MCCONNEL.